United States Patent [19]

Kaufmann, Jr.

[11] 4,284,298
[45] Aug. 18, 1981

[54] PIPE COUPLING

[75] Inventor: John Kaufmann, Jr., 3716 Woodrow Ave., Pittsburgh, Pa. 15227

[73] Assignee: John Kaufmann, Jr., Pittsburgh, Pa.

[21] Appl. No.: 110,551

[22] Filed: Jan. 8, 1980

[51] Int. Cl.³ .............................................. F16L 27/12
[52] U.S. Cl. .................................. 285/302; 285/351; 285/373
[58] Field of Search .............. 285/373, 419, 302, 351, 285/233

[56] References Cited

U.S. PATENT DOCUMENTS

| 793,135 | 6/1905 | Kellogg | 285/373 |
| 1,913,030 | 6/1933 | Hux | 285/373 X |
| 2,490,640 | 12/1949 | Lefevre-Selmer | 285/373 X |
| 3,154,328 | 10/1964 | Masse | 285/373 X |
| 3,482,859 | 12/1969 | Bowlin | 285/373 X |
| 4,055,359 | 10/1977 | McWethy | 285/351 X |
| 4,168,090 | 9/1979 | Kaufmann, Jr. | 285/419 X |

Primary Examiner—Thomas F. Callaghan

[57] ABSTRACT

A pipe coupling for joining interengaging ends of a pair of pipes in axial alignment comprised of a pair of semicircular substantially identical sections adapted to mate with one another to hold the pipe ends therein. Each of the sections have cooperating locating flanges engaging corresponding surfaces in one of the pipe ends to facilitate the assembly thereof whereafter releasable securing means are disposed in aligned openings to maintain the sections in place.

1 Claim, 1 Drawing Figure

U.S. Patent  Aug. 18, 1981  4,284,298
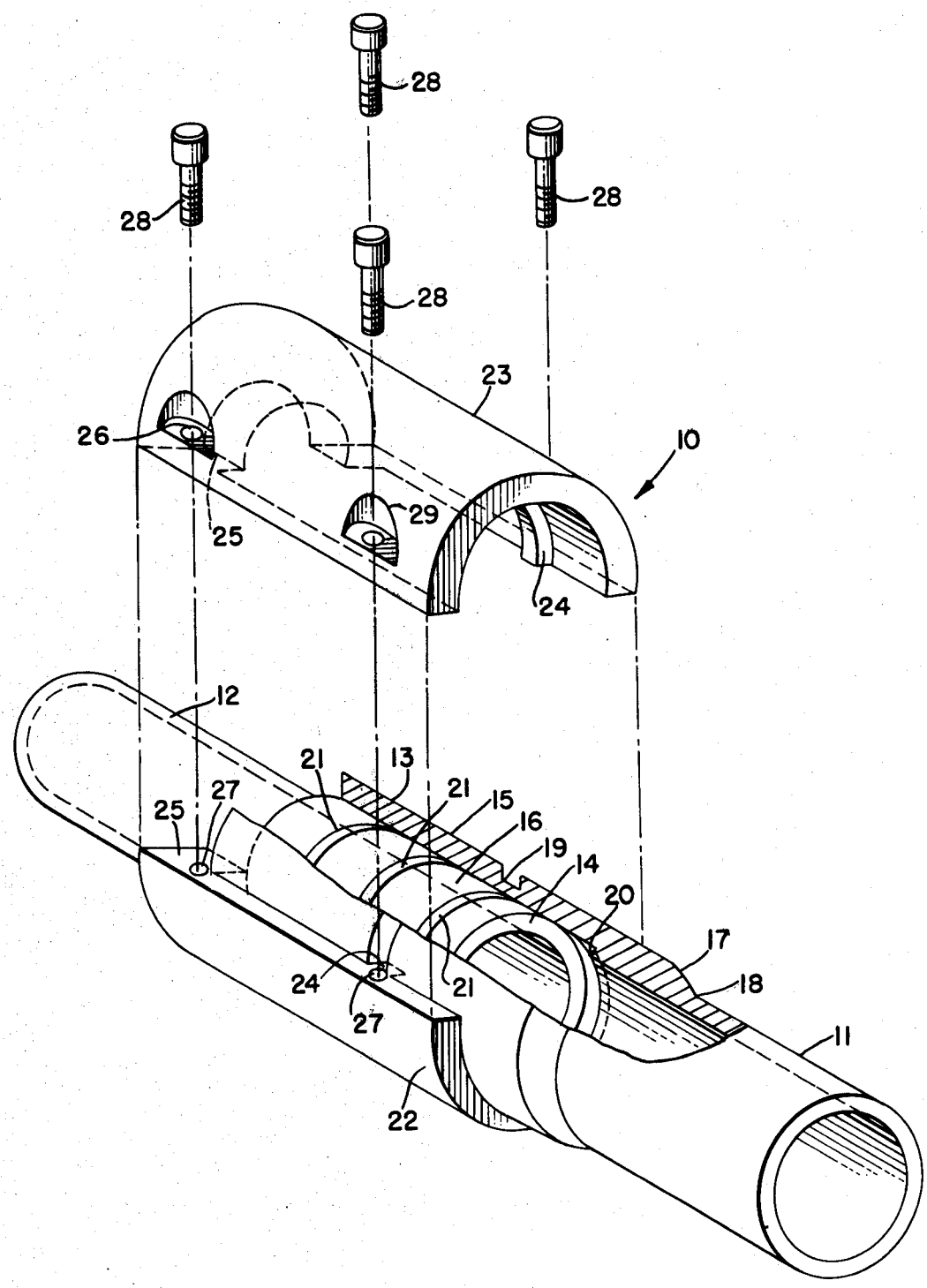

PIPE COUPLING

BACKGROUND OF THE INVENTION

A multitude of various types of couplings for joining pipe ends in end-to-end relationship have been developed over the years. The aim of most of these couplings is to provide an efficient, economical and readily manipulable coupling which can be assembled and disassembled in a minimum of time without special tools. These couplings take different shapes and forms and are in the main, dependent upon the characteristics of the pipes to be joined and the environment in which the same are to be used.

Class 285 in the U.S. Patent Office is directly solely to couplings and can be referred to for various teachings presently available to users and manufacturers.

SUMMARY OF THE INVENTION

Generally speaking, the coupling of the present invention concerns itself with the maintaining of interengaging, telescoping aligned pipe ends in a compact and sturdy relationship while allowing for expansion and contraction of the same under varying temperature conditions. The coupling comprises a sleeve of sufficient length formed of two semi-circular elongated sections which mate and are joined with one another to secure the aligned pipe ends. Each section is provided with an internal circumferential locating flange and an end flange which cooperate with a recess and the end of the outer pipe, respectively, to facilitate the locating of and assembly of the coupling with respect thereto. Aligned openings are provided in the respective sections for receiving removable fasteners for securing one to the other.

The coupling sleeve 10 is comprised of two semi-circular identical sections 22, 23 having flanges 24, 25 extending inwardly from the main body thereof. Flanges 24, 24 are formed remote from ends 26, 26 of the of the sections 22, 23 while the flanges 25, 25 are formed at the opposite end thereof. Additionally, each section 22, 23 is provided with a plurality of aligned openings 27 adapted to receive suitable fasteners 28 for locking the sections together. Cutouts 29 are formed about the openings 27, in section 23 to permit a tool to be disposed therein to engage a fastener head during the fastening and unfastening stages.

In use, pipe end 14 of conduit 12 is forced into the enlarged portion 13 of conduit 11 until it engages stop 20 with the O-rings disposed in recesses 21 being in engagement with the interior wall of the enlarged portion 15 to provide a fluid tight seal therebetween. At this point, the coupling sections 22 and 23 are disposed around the enlarged portion 15 and are located by positioning the flanges 24, 24 in the complementary circumferential recess 19 and by positioning the flanges 25, 25 in engagement with the pipe end 13, and behind the thickened portion 16 of pipe 12. Fastener members 28 are then positioned in the aligned openings 27, 27 for securing the coupling halves together. It is apparent then, that the pipe ends 13, 16 are secured and axially aligned to one another and endwise movement is limited by the flanges 25, 25 in a simple and efficient manner.

BRIEF DESCRIPTION OF THE DRAWING

The sole FIGURE discloses an exploded view of the pipe ends and their relationship to one another and the manner in which the coupling sleeve cooperates therewith for locking the same together in axial alignment.

BRIEF DESCRIPTION OF THE PREFERRED EMBODIMENT

With reference to the drawing, the pipe coupling is designated generally at 10, and is used to connect two pipes, conduits or any tubular members 11, 12 of any cross-sectional configuration in end-to-end axial alignment. The conduits 11, 12 have respective ends 13, 14 formed as enlarged thickened portions 15, 16. In this regard, the enlarged section 15 includes an external taper extending upwardly as at 17, from a circumferential line 18 disposed about the pipe 11 inwardly of the end 13. The section 15 is provided on its external surface with a circumferential keyway or recess 19 and in this instance, is of rectangular configuration which acts as a locating means for the coupling 10. Additionally, the internal portion of the section 15 is formed with a circumferential step 20 or abutment positioned inwardly from the line 18 and is disposed inwardly from the recess 19. This abutment acts as a stop member for the enlarged portion 16 of the conduit 12 when the same is inserted therewithin. The enlarged portion 16 of the conduit 12 is formed generally in the manner as described in conjunction with portions 15 and is provided with a plurality of spaced recesses 21, 21, 21 extending inwardly from the end 14 within which O-rings of standard construction are disposed.

I claim:

1. A coupling for maintaining pipe ends in end-to-end axial alignment, said pipe ends being thickened with one disposed with the other, stop means being provided on the interior of the outer thickened portion to limit the extent of insertion of the other thickened portion, an annularly disposed recess disposed on the thickened portion of the outer pipe, and a plurality of spaced O-rings disposed on the inner thickened portion in engagement with the interior of the outer thickened portion, said coupling comprising a pair of substantially identical sections, each section defining a body of substantial length and having an interior annular locating flange extending inwardly from one end of the body and an annular inwardly extending flange formed at the other end, said flanges being peripherally disposed whereby when the sections are mated, the flanges will be disposed in a common plane, with the interior annular flange being disposed in said annular recess and the flange formed at the other end engaging the thickened portions of the outer and inner pipe ends, and fastening means releasably securing the sections together, said fastening means comprising aligned openings in the sections receiving removable fastener means.

* * * * *